United States Patent
Lin

(10) Patent No.: US 10,694,854 B1
(45) Date of Patent: Jun. 30, 2020

(54) PORTABLE GRAVITY REDUCING APPARATUS FOR SITTING POSITIONS

(71) Applicant: Song Lin, Pierrefonds (CA)

(72) Inventor: Song Lin, Pierrefonds (CA)

( * ) Notice: Subject to any disclaimer, the term of this patent is extended or adjusted under 35 U.S.C. 154(b) by 84 days.

(21) Appl. No.: 16/211,242

(22) Filed: Dec. 6, 2018

(51) Int. Cl.
  *A47C 7/40* (2006.01)
  *A61H 1/02* (2006.01)

(52) U.S. Cl.
  CPC .......... *A47C 7/402* (2013.01); *A61H 1/0229* (2013.01)

(58) Field of Classification Search
  CPC .......... A47C 7/40–44; A61F 5/04–048; A61H 1/0218; A61H 1/0229; B60R 22/12; B60R 22/20
  See application file for complete search history.

(56) References Cited

U.S. PATENT DOCUMENTS

| | | | |
|---|---|---|---|
| 1,611,807 A | 12/1926 | Bergh | |
| 2,803,245 A | 8/1957 | Judovich | |
| 3,118,441 A | 1/1964 | George | |
| 3,252,704 A | 5/1966 | Wilson | |
| 3,597,774 A | 8/1971 | Warren | |
| 3,716,049 A * | 2/1973 | Kaplan | A61H 1/0229 602/32 |
| 4,431,234 A * | 2/1984 | Lacey | B60J 5/0487 297/183.9 |
| 4,603,689 A | 8/1986 | Homer | |
| 4,688,557 A | 8/1987 | Bradstreet | |
| 4,903,355 A | 2/1990 | Hickerson | |
| 4,981,148 A * | 1/1991 | Fuller | A61F 5/3792 128/101.1 |
| 5,569,129 A | 10/1996 | Seif-Naraghi et al. | |
| 5,709,649 A * | 1/1998 | Chitwood | A61F 5/04 128/845 |
| 5,713,841 A * | 2/1998 | Graham | A61H 1/0218 602/32 |
| 5,848,984 A | 12/1998 | Bachar et al. | |
| 5,868,694 A * | 2/1999 | Marlow | A61F 5/026 602/19 |
| 6,447,468 B1 * | 9/2002 | Hankins | A61F 5/012 128/845 |
| 6,679,510 B2 | 1/2004 | Perena | |
| 7,437,789 B2 * | 10/2008 | Thompson | A47C 7/467 5/626 |
| 8,251,939 B2 * | 8/2012 | Aune | A61H 1/0296 602/18 |
| 8,303,626 B2 * | 11/2012 | Fischer | A61F 5/055 602/13 |
| 8,684,468 B2 * | 4/2014 | Bourdon | B60N 2/90 297/466 |
| 2004/0225243 A1 | 11/2004 | Leach | |
| 2017/0128310 A1 | 5/2017 | Roeder | |
| 2019/0015235 A1 * | 1/2019 | Badger | A61F 5/026 |

* cited by examiner

*Primary Examiner* — Kristen Matter

(57) ABSTRACT

A portable gravity reducing apparatus is provided, which may be installed on a headrest of a fitted seat in a car, bus, plane, or an office chair. A pair of looped straps or under shoulder harnesses serves to lift the user's upper body via one or more hand pump driven pneumatic bags. The apparatus can be fitted to and detached from existing seats and chairs in a quick and easy manner in a variety of embodiments.

6 Claims, 5 Drawing Sheets

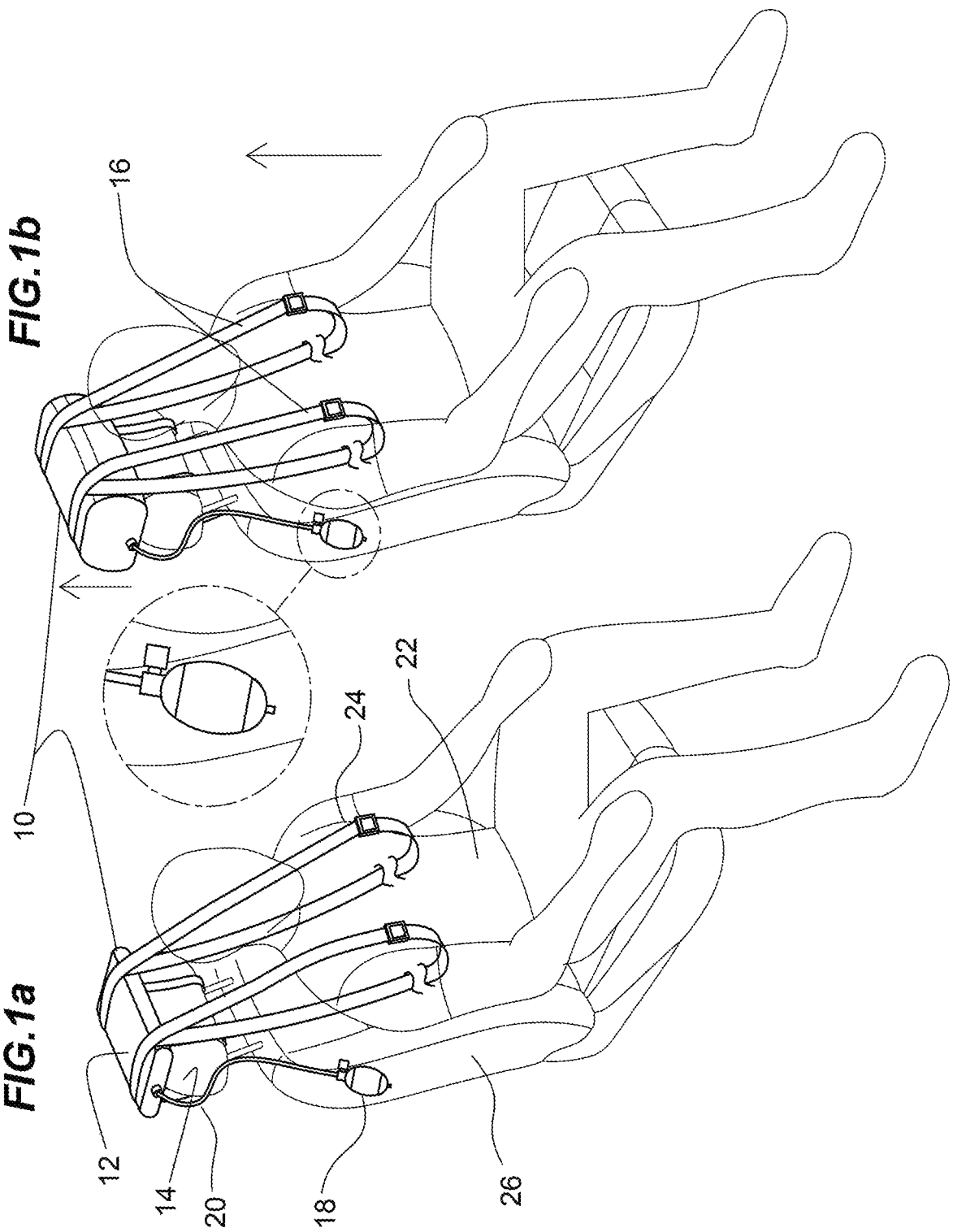

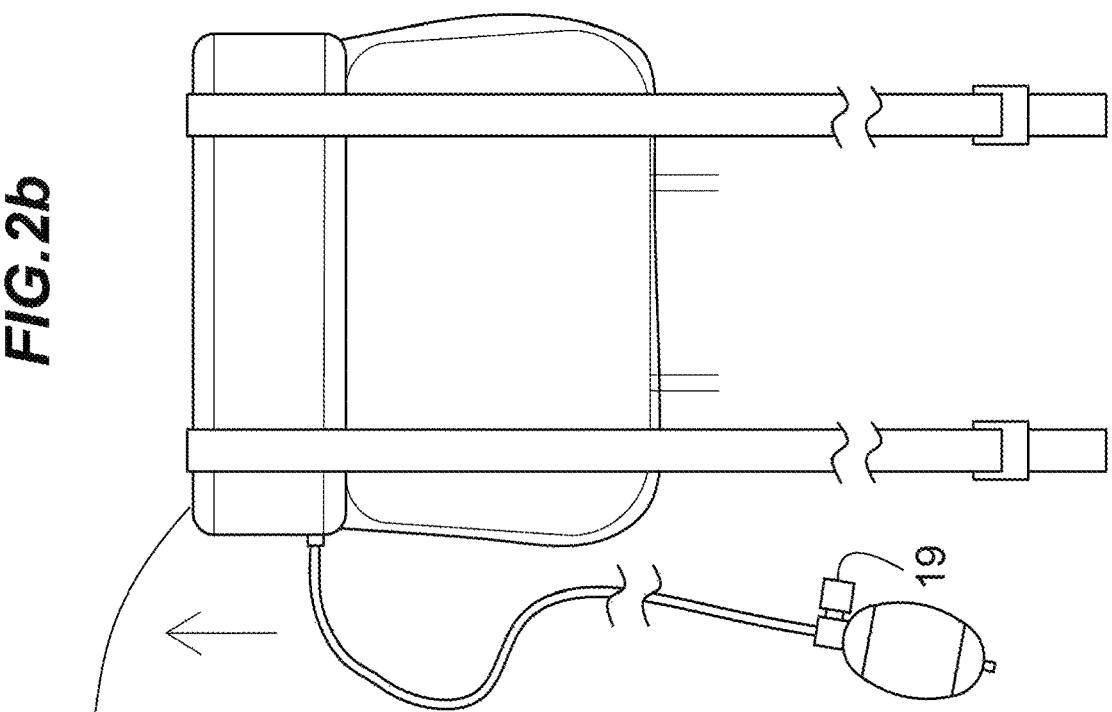
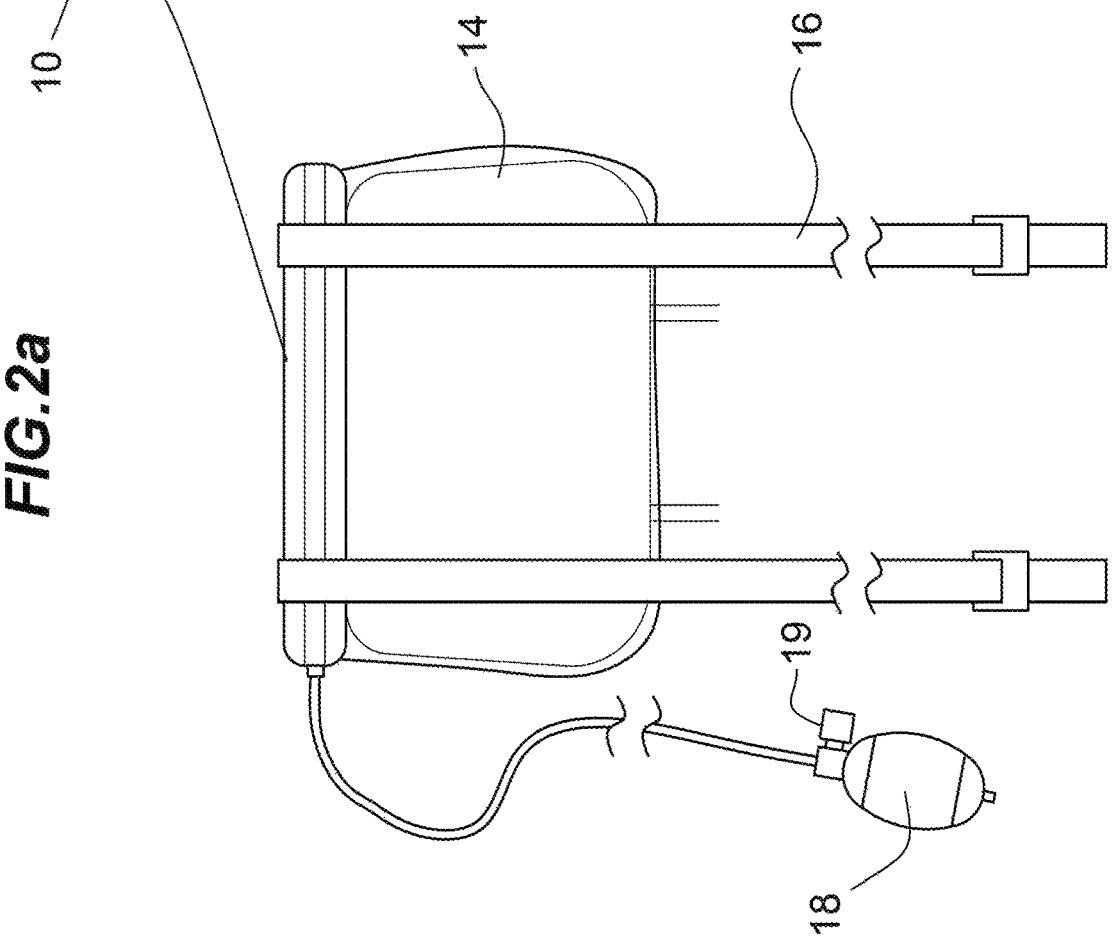

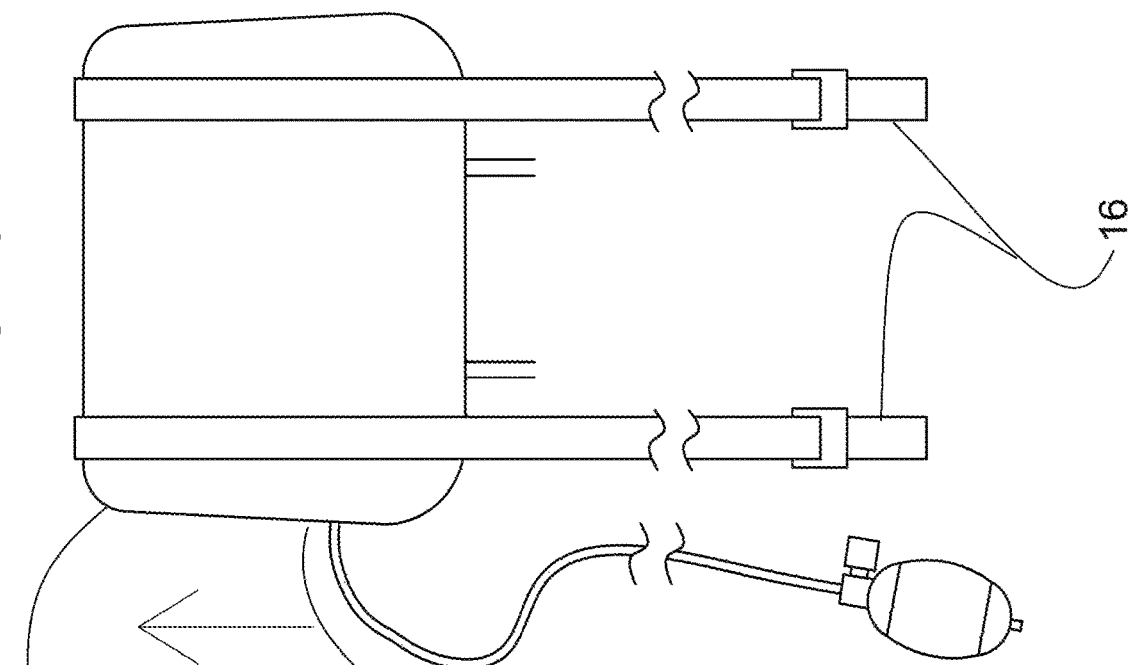
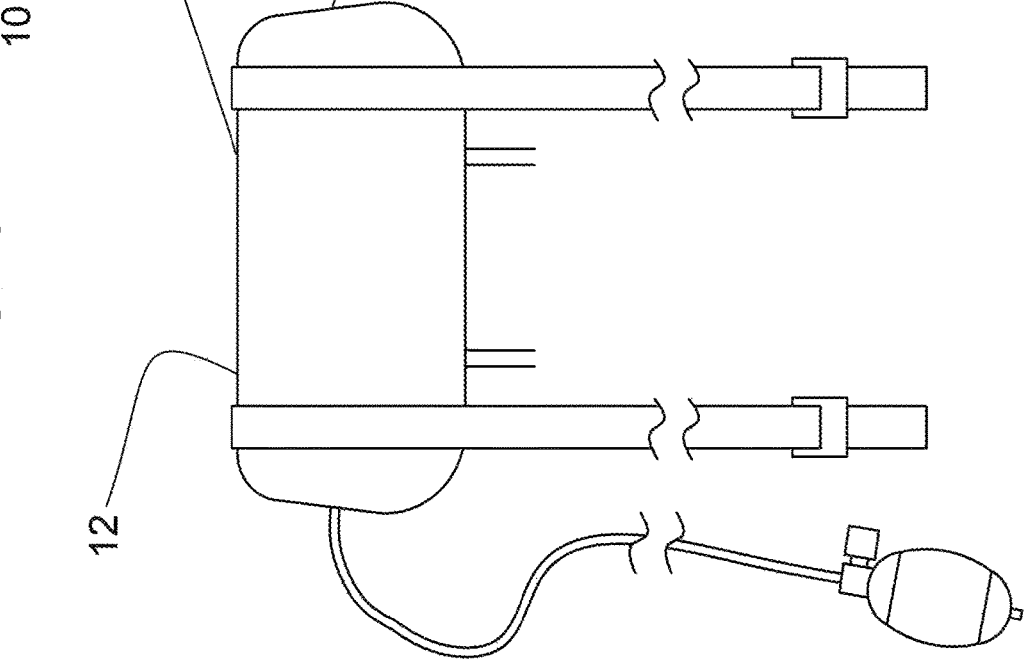

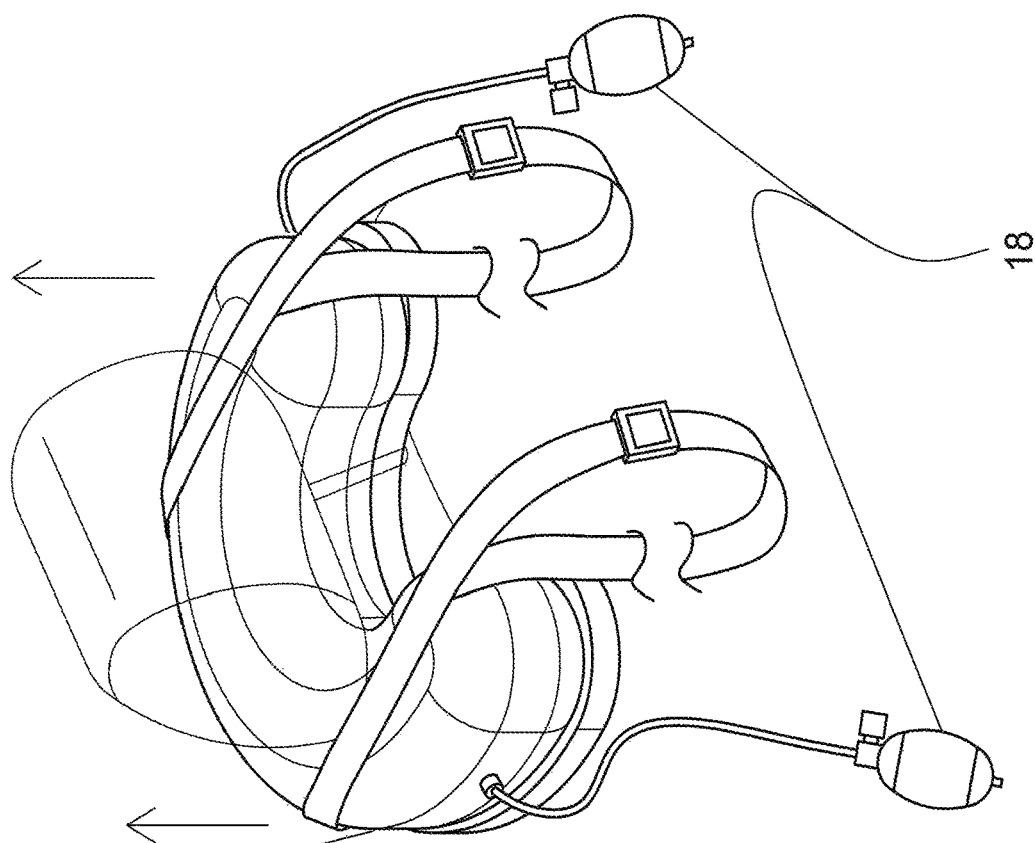
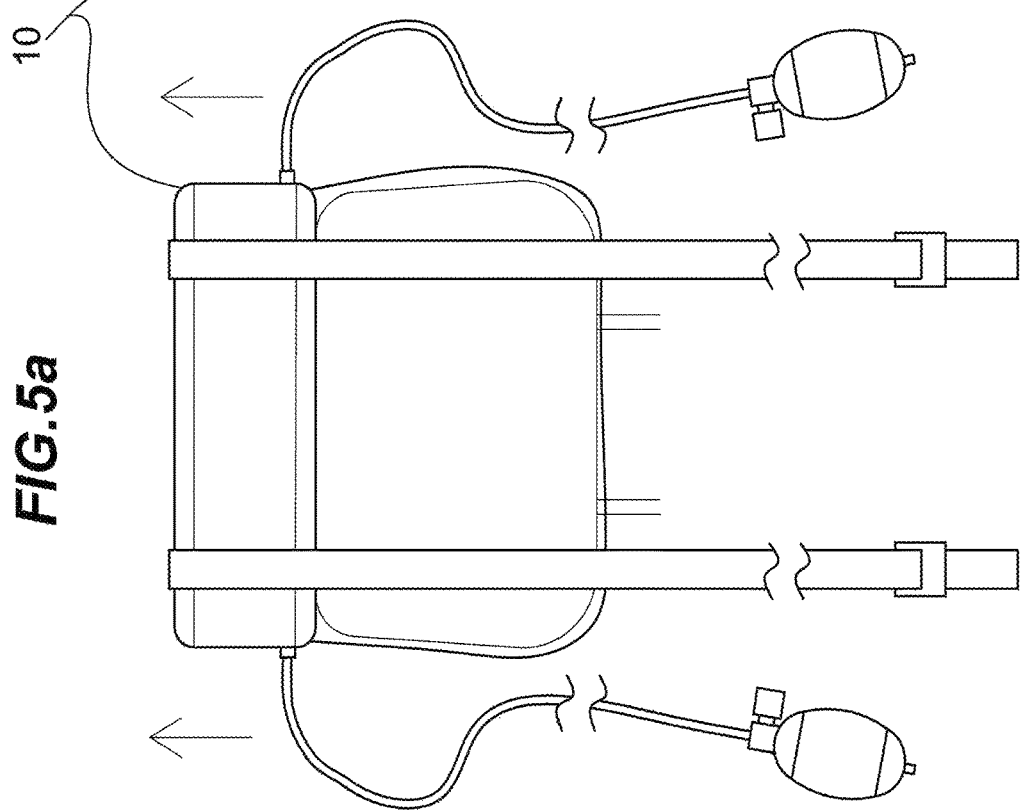

PORTABLE GRAVITY REDUCING APPARATUS FOR SITTING POSITIONS

CROSS-REFERENCE TO RELATED APPLICATIONS

N/A

BACKGROUND OF THE INVENTION

1. Field of the Invention

The present invention relates generally to a gravity reducing apparatus but more particularly to a portable gravity reducing apparatus for sitting positions that is configured to be fitted to or incorporated into the headrest of a seat or chair.

2. Description of Related Art

Sitting for extended periods of time is more common these days whether at work, at home or traveling by car, bus, train, or plane. People spend between 7 to 10 hours on average sitting. Poor circulation, posture problems and slower metabolism are some of the issues correlated with sitting for extended periods of time. Alleviating a part of the weight on our backs, buttocks, and thighs reduces fatigue and enhances blood circulation. Consequently, there is a need for an improved mechanism which is easy to use in order to alleviate the effects of gravity while sitting.

BRIEF SUMMARY OF THE INVENTION

In one aspect of the invention, a portable gravity reducing apparatus for sitting positions is provided, comprising an inflatable body having a top surface, wherein the inflatable body is configured to attach to a headrest of a seat; one or more hand pumps configured to inflate the inflatable body; a release valve configured to deflate the inflatable body; and, a pair of looped straps attached and suspended from the top surface, the pair of looped straps adapted to be positioned under a user's underarms such that when the user inflates the inflatable body via the one or more hand pumps, the top surface and the pair of looped straps rise during the inflation process reducing the pressure of gravity from the user's body.

In one embodiment, the inflatable body includes at least one airbag configured to inflate and deflate. In one embodiment, the inflatable body is configured to fit over the headrest and is held in place with a fastening element. In another embodiment, the inflatable body is C-shaped and is configured to fit around the headrest. In one embodiment, the apparatus is portable.

In another aspect of the invention, a portable gravity reducing apparatus for sitting positions is provided, comprising an inflatable body having a top surface, wherein the inflatable body is formed in the shape of a headrest and is configured to be attached to a seat; one or more hand pumps configured to inflate the inflatable body; a release valve configured to deflate the inflatable body; and, a pair of looped straps attached and suspended from the top surface, the pair of looped straps adapted to be positioned under a user's underarms such that when the user inflates the inflatable body via the one or more hand pumps the top surface and the pair of looped straps rise during the inflation process reducing the pressure of gravity from the user's body.

BRIEF DESCRIPTION OF THE SEVERAL VIEWS OF THE DRAWINGS

Other features and advantages of the present invention will become apparent when the following detailed description is read in conjunction with the accompanying drawings, in which:

FIGS. 1A-B are isometric views of a portable gravity reducing apparatus in use according to an embodiment of the present invention.

FIGS. 2A-B are isometric views of showing the bag of the portable gravity reducing apparatus in use according to an embodiment of the present invention.

FIGS. 4A-B are isometric views of showing the headrest in deflated and inflated positions respectively according to embodiments of the present invention.

FIGS. 5A-B are isometric views of showing two embodiments of the portable gravity reducing apparatus.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a portable gravity reducing apparatus for sitting positions.

Figure 3B:
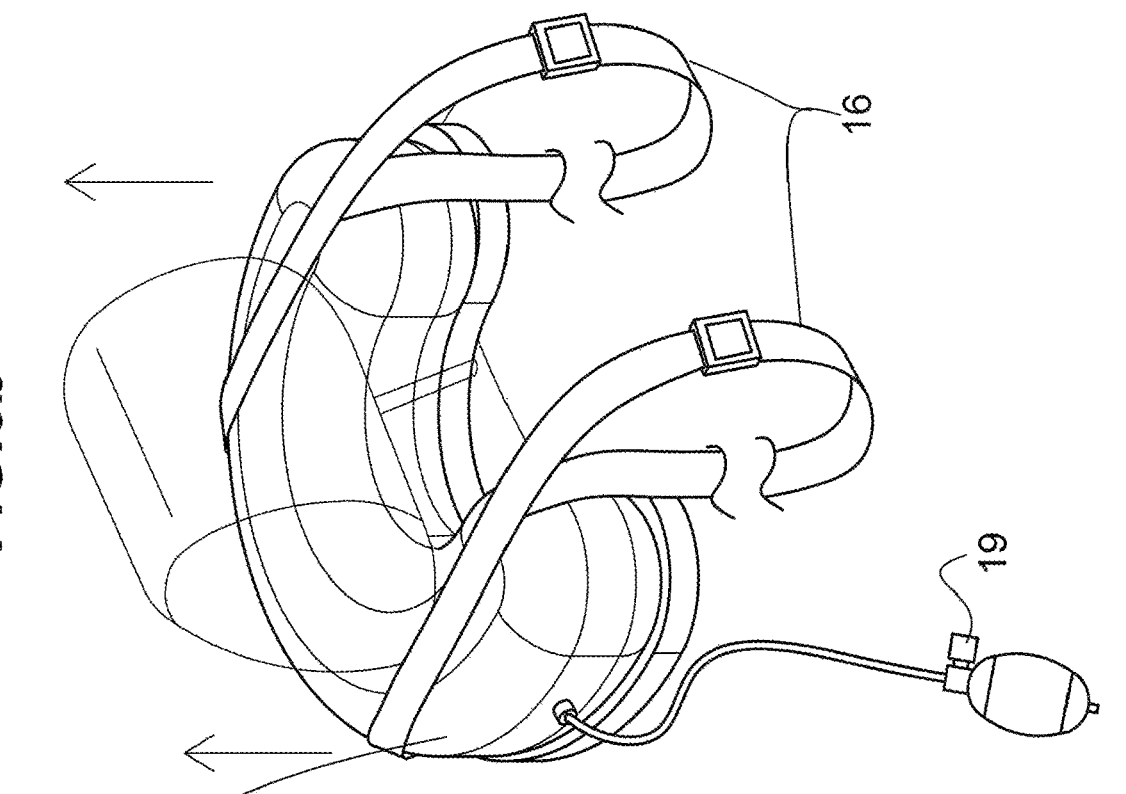
FIGS. 3A-B are isometric views of showing a C-shaped collar embodiment, in deflated and inflated positions respectively according to embodiments of the present invention.
Figure 3A:
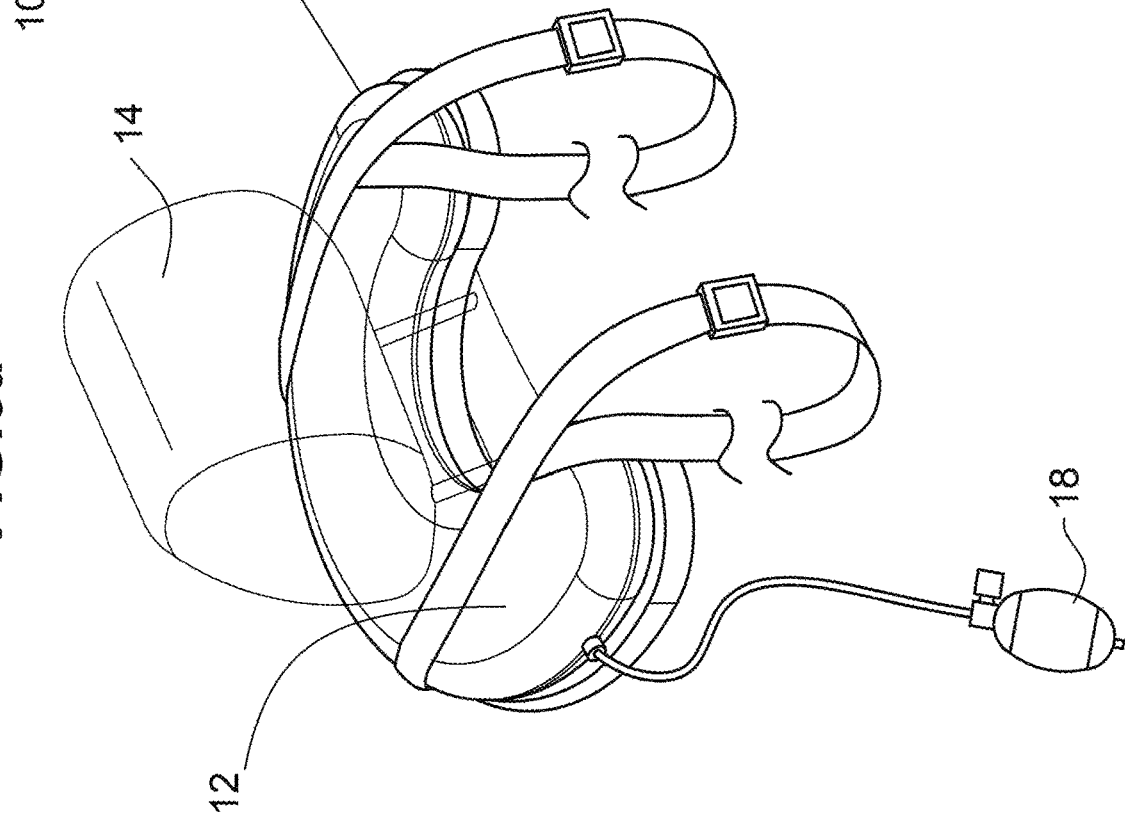

Referring to any of the accompanying FIGS. 1-5, the portable gravity reducing apparatus 10 is illustrated. The portable gravity reducing apparatus is configured to attach to a headrest 14 of a seat 26. In one embodiment, the apparatus comprises a pair of looped straps 16 attached and suspended from a top surface 12. One or more hand pumps 18 connected via pipes 20 are used for inflating airbags inside apparatus. Preferably, the pumps are easily accessible and hang down from apparatus. This is best illustrated when viewing the comparison from FIG. 1A to FIG. 1B, showing the deflated and inflated airbag respectively, as the size of the apparatus is increased.

During use, a user 22 positions the pair of looped straps under their underarms 24 and pumps the one or more hand pumps to inflate the apparatus such that the top surface rises and pulls the pair of looped straps upwards, lifting the user gently. It is a particular advantage of the present invention to alleviate some of the effects of gravity on the user, thus as the pair of looped straps rise during the inflation process, the user's underarms are supported such that some of the weight of the user is relieved, reducing pressure on the user's back, buttocks, and thighs, allowing a longer and more comfortable sitting experience. The pair of looped straps is installed and positioned much like the straps on the backpack on a user. In one embodiment, an adjustment means is provided to adjust the length of the looped straps such for different sized users. In one embodiment, one or more release valves 19 are configured to deflate the airbags. Preferably, the one or more release valves are positioned approximate to the one or more hand pumps.

In one embodiment, best seen in FIGS. 2A-B, the apparatus is configured to fit like a bag over the headrest and is held in place with a fastening means, such as ties (not illustrated). In an alternative embodiment, best seen in FIGS. 3A-B, the apparatus has a C-shaped body configured to fit around the headrest. In yet another embodiment, best seen in FIGS. 4A-B, the apparatus is constructed in the form of a headrest 14' which is designed to replace the original headrest 14 of seat 26.

Advantageously, the apparatus is portable, and may be used on any seat, such as an office chair or a seat in a car, bus, and plane. The apparatus can be fitted to and detached from the existing seats and chairs in a quick and easy manner ensuring portability and ease of use.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A portable gravity reducing apparatus for sitting positions comprising:

an inflatable body having a top surface, wherein the inflatable body is configured to attach to a headrest of a seat;

one or more hand pumps configured to inflate the inflatable body;

a release valve configured to deflate the inflatable body; and, a pair of looped straps attached and suspended from the top surface, the pair of looped straps adapted to be positioned under a user's underarms such that when the user inflates the inflatable body via the one or more hand pumps, the top surface and the pair of looped straps rise during the inflation process reducing the pressure of gravity from the user's body.

2. The portable gravity reducing apparatus for sitting positions of claim 1, wherein the inflatable body includes at least one airbag configured to inflate and deflate.

3. The portable gravity reducing apparatus for sitting positions of claim 1, wherein the inflatable body is configured to fit over the headrest and is held in place with a fastening element.

4. The portable gravity reducing apparatus for sitting positions of claim 1, wherein the inflatable body is C-shaped and is configured to fit around the headrest.

5. The portable gravity reducing apparatus for sitting positions of claim 1, wherein the apparatus is portable.

6. A portable gravity reducing apparatus for sitting positions comprising:

an inflatable body having a top surface, wherein the inflatable body is formed in the shape of a headrest and is configured to be attached to a seat;

one or more hand pumps configured to inflate the inflatable body;

a release valve configured to deflate the inflatable body; and, a pair of looped straps attached and suspended from the top surface, the pair of looped straps adapted to be positioned under a user's underarms such that when the user inflates the inflatable body via the one or more hand pumps the top surface and the pair of looped straps rise during the inflation process reducing the pressure of gravity from the user's body.

* * * * *